Patented Feb. 26, 1946

2,395,642

UNITED STATES PATENT OFFICE 2,395,642

POLYMERIC MATERIALS

William W. Prichard, Wilmington, Del., assignor to E. I. du Pont de Nemours & Company, Wilmington, Del., a corporation of Delaware No Drawing. Application October 27, 1941, Serial No. 416,723

6 Claims. (Cl. 260—2)

This invention relates to polymeric materials and more particularly to polymers obtained from the dihydrazides of dicarboxylic acids.

This invention has as an object the production of new and useful polymers from dihydrazides of dicarboxylic acids. Other objects will appear hereinafter.

The above and other objects are accomplished by heating a dihydrazide of a dicarboxylic acid in which the carboxyl groups are attached to aliphatic carbons at a temperature sufficient to cause evolution of water, until a polymeric material fusible below its charring point and having an intrinsic viscosity, as defined in United States Patent 2,130,948, of at least 0.1 is obtained, and interrupting the polymerization before the reaction product becomes infusible, that is, before or at the appearance in the distillate of the basic nitrogenous materials which are evolved as the infusible stage is reached.

I have found that fusible useful products can be obtained from the above reactants if the temperature and time of heating are controlled as described herein to prevent evolution of basic nitrogenous materials in substantial amount. The polymers of this invention when obtained with dicarboxylic acids containing up to about 6 to 8 carbon atoms are usually water-soluble, transparent resins of value as agents for increasing the receptivity of synthetic fibers to acid dyestuffs. Polymers from dihydrazides of dicarboxylic acids of more than about 8 carbon atoms are usually not water-soluble but may be readily melt cast into films and coating compositions. Adipic dihydrazide polymerizes to a particularly valuable polymer which is slightly soluble in water, basic, and which couples readily with diazonium compounds. The product obtained by polymerization of a dihydrazide of a hydroxy acid formal is also of especial utility because of its water solubility.

The polymerization of dihydrazides of dicarboxylic acids is carried out by heating the hydrazides at a temperature sufficient to cause evolution of water and preferably above the melting point of the hydrazide and in an inert atmosphere. Any vessel may be used which can be maintained at the desired temperature, but one which can be evacuated is preferable. As a rule, temperatures between 180°–210° C. are employed and heating continued under nitrogen until vigorous bubbling ceases (1–4 hours), and finished under reduced pressure for 1–3 hours. The vacuum heating period, although not necessary, makes possible the production of high molecular weight products at reduced temperature. In this way, polymers with intrinsic viscosities as high as 0.84 may be obtained from sebacic and brassylic dihydrazides. The preferred temperatures lie within the range of 160° to 255° C. In general, it is desirable to use as low a temperature as possible and still maintain a molten polymer. The use of abnormally high temperatures tends to cause undesirable side reactions and gives infusible products.

The dihydrazides of dicarboxylic acids used in the practice of this invention are prepared in the known manner, the preferred raw materials being esters of dicarboxylic acids and hydrazine hydrate. A method of preparation is described by Curtius, J. prakt. Chem. 91, 1–38 (1915). It is to be observed that the polyamides obtained by reacting hydrazine as the diamine with a dicarboxylic acid are entirely different from the polymers described herein since in the polyamide reaction the conditions are not such that the hydrazide is first formed and subsequently polymerized and further the polyamide-forming reaction would require 1 mol of hydrazine per mol of dicarboxylic acid, whereas the process of this invention uses 2 mols of hydrazine per mol of acid. Of the possible structures for the present polymers the one apparently most probable on the available evidence is one in which the polymer is composed essentially of 4-aminotriazole units joined by divalent radicals, although the analytical data indicates a more complex composition than one made up of these simple units.

The following examples are further illustrative of the practice of this invention.

*Example I*

Brassylic dihydrazide was heated in a sealed evacuated vessel for 1 hour at 210° C., then under an atmosphere of nitrogen for 1 hour at 230° C., and finally for 3 hours under 5 mm. pressure at 230° C. The melt grew progressively more viscous during the heating period. The product, an opaque, brittle polymer, melted at 181°–182° C. and had an intrinsic viscosity of 0.72. The molten polymer could be spun into long fibers.

*Example II*

Adipic dihydrazide was heated in an evacuated sealed vessel at 210° C. for 1 hour, under an atmosphere of nitrogen for 15 minutes at 210° C. and under 5 mm. pressure at 210° C. for 1½ hours. The resulting product was a brittle, transparent, colorless polymer melting at 137° C., with an intrinsic viscosity of 0.35. The molten polymer could be spun into long fiber. This product was readily soluble in dilute acids and bases. Titration of a solution of the product showed it to be basic and possess a neutral equivalent of 172. This product coupled readily with diazonium salts in alkaline solution and the diazonium salts could be regenerated from this coupled product by treatment with mineral acids. Analysis C 49.54. H 6.81, N 32.21. The deficiency (11.5%) is apparently oxygen. A polyhydrazide from adipic acid and hydrazine would contain 22.5% of oxygen.

*Example III*

Sebacic dihydrazide was heated under an atmosphere of nitrogen for 2¾ hours at 210° C., then under 5 mm. pressure at 210° C. for 1 hour, and finally under 5 mm. pressure at 230° C. for 2½ hours. The product was a brittle, opaque solid melting at 183° C. with an intrinsic viscosity of 0.84. The molten polymer was readily spun into long fibers. Analysis: C 59.87, H 9.18, N 21.80. The deficiency (9.15%) is apparently oxygen. A polyhydrazide from sebacic acid and hydrazine would contain 16.6% of oxygen.

*Example IV*

Methylene bis-(oxyacetic hydrazide),

was heated in a nitrogen atmosphere for 1 hour at 180° C. and then under 5 mm. pressure for 2 hours at 180° C. The product was a transparent, brittle resin which softened at 78°–83° C. This product was very soluble in cold water and was basic in character.

*Example V*

Succinic dihydrazide was heated at 200° C. under an atmosphere of nitrogen for 1½ hours. The melt increased greatly in viscosity during this period. The product was a brittle, water-soluble polymer melting at 153°–155° C. and having an intrinsic viscosity of 0.12.

*Example VI*

Ethyl malonyl dihydrazide was heated at 180° C. under an atmosphere of nitrogen for 1 hour. Water was evolved and the melt increased in viscosity during the heating period. The product was a brittle, water-soluble, transparent polymer melting at 60°–73° C.

*Example VII*

A mixture of equal parts by weight of adipic dihydrazide and the hexamethylenediamine salt of adipic acid was heated in a sealed vessel for 1¼ hours at 210° C., then in an open vessel under a nitrogen atmosphere for ½ hour at 230° C. and finally under a pressure of 5 mm. for 1 hour at 230° C. The product was a transparent, colorless polymer softening at 100°–105° C. which could be spun to long fibers capable of being oriented when drawn.

*Example VIII*

An interpolymer was prepared by heating sebacic dihydrazide (1.5%) and hexamethylenediammonium adipate (98.5%). A film of this polymer was dyed with a neutral dyeing acid dye (Rowe Color Index No. 430). An appreciable increase in dye receptivity was noted over that of the unmodified polyamide.

*Example IX*

The dihydrazide of tartaric acid acetal

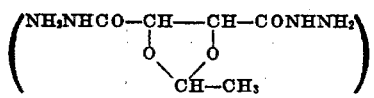

was heated under nitrogen at 180° C. The melt increased rapidly in viscosity as water was distilled. After 1 hour the polymer was a light orange, transparent solid softening at 128° C.

The polymerization can be carried out in an inert solvent such as xylene, diisoamylether or naphthalene if desired.

Valuable interpolymers can be obtained by heating a mixture of the dihydrazide of a dicarboxylic acid with polyamide-forming compositions consisting of reacting material of the kind described in the previously mentioned patent namely, a mixture of diamine and dibasic carboxylic acid which is usually used in the form of the salt obtained therefrom, and in United States Patent 2,071,253 which discloses the production of polyamides from self-polymerizable monoaminomonocarboxylic acids.

The dihydrazides of some dicarboxylic acids are difficult or impossible to prepare, but on the basis of the present knowledge all the obtainable dihydrazides of dicarboxylic acids in which the carboxyl groups are attached to aliphatic carbons are operable in the present process. Thus, although dihydrazides of dicarboxylic acids in which the carboxyl groups are separated by less than four atoms might be expected to form monomeric cyclic compounds, they polymerize readily to give polymeric materials. Other dihydrazides from which the present polymers can be obtained include those of oxalic, glutaric, para-phenylene diacetic, cyclohexane dicarboxylic acid and other aliphatic, cycloaliphatic or alkylaromatic dicarboxylic acids. Thiodibutyric, diglycolic, para-phenylene dioxyacetic, methyliminodiacetic or other dicarboxy acid dihydrazides containing oxygen, sulfur or amino groups in the chain may be polymerized. Dicarboxylic acid dihydrazides containing hydroxyl groups, or halogen atoms such as malic, tartaric and chlorosuccinic acid dihydrazides may also be polymerized.

The products of this invention are useful in the production of filaments, fibers or films, and as agents for increasing the dye receptivity of synthetic fibers toward acid dyestuffs. A small amount (3–5%) of adipic dihydrazide polymer, when dissolved in a viscose solution enhances the receptivity toward acid dyestuffs of yarn spun from the solution.

As many apparently widely different embodiments of this invention may be made without departing from the spirit and scope thereof, it is to be understood that I do not limit myself to the specific embodiments thereof except as defined in the appended claims.

I claim:

1. A process for making fusible polymers which comprises heating a preformed dihydrazide of a dicarboxylic acid, in which the carboxyl groups are attached to aliphatic carbon atoms, at a temperature sufficient to cause evolution of water, continuing the heating until a polymer having an intrinsic viscosity of at least 0.1 is obtained, and discontinuing the polymerization before evolution in substanial amount of the basic nitrogenous materials that are evolved when the infusible stage is reached.

2. A process for making fusible polymers which comprises heating a preformed dihydrazide of a dicarboxylic acid, in which the carboxyl groups are attached to aliphatic carbon atoms, in an inert atmosphere, at a temperature sufficient to cause evolution of water, continuing the heating under reduced pressure, and discontinuing the polymerization before evolution in substantial amount of the basic nitrogenous materials that are evolved when the infusible stage is reached.

3. A process for making fusible polymers which comprises heating a preformed dihydrazide of a dicarboxylic acid, in which the carboxyl groups are attached to aliphatic carbon atoms, in an inert atmosphere at a temperature of from 160° to 255° C., continuing said heating under reduced pressure, and discontinuing the polymerization before evolution in substantial amount of the basic nitrogenous materials that are evolved when the infusible stage is reached.

4. A fusible polymer having an intrinsic viscosity of at least 0.1 composed of the polymerization product of polymerizable material consisting essentially of that selected from the group consisting of (a) a preformed dihydrazide of a dicarboxylic acid, in which the carboxylic groups are attached to aliphatic carbon atoms, and (b) mixtures of said preformed dihydrazide with a polyamide-forming composition in which the reacting material is bifunctional and in which the functional groups consist of complementary amino and carboxyl groups.

5. A fusible polymer having an intrinsic viscosity of at least 0.1 composed of the polymerization product of polymerizable material consisting of preformed dihydrazide of a dicarboxylic acid, in which the carboxylic groups are attached to aliphatic carbon atoms.

6. A water soluble fusible polymer as defined in claim 5 in which the dicarboxylic acid of the dihydrazide contains not more than 8 carbon atoms.

WILLIAM W. PRICHARD.